United States Patent
Lee

(10) Patent No.: US 10,563,600 B2
(45) Date of Patent: Feb. 18, 2020

(54) CONTROL SYSTEM OF ELECTRIC SUPERCHARGER AND CONTROL METHOD FOR THE SAME

(71) Applicants: HYUNDAI MOTOR COMPANY, Seoul (KR); KIA MOTORS CORPORATION, Seoul (KR)

(72) Inventor: Jungsub Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 15/833,789

(22) Filed: Dec. 6, 2017

(65) Prior Publication Data

US 2019/0128195 A1 May 2, 2019

(30) Foreign Application Priority Data

Nov. 2, 2017 (KR) .................. 10-2017-0145539

(51) Int. Cl.

| F02M 26/08 | (2016.01) |
|---|---|
| F02M 26/44 | (2016.01) |
| F02B 29/04 | (2006.01) |
| F02B 37/04 | (2006.01) |
| F02B 39/10 | (2006.01) |
| F02M 35/10 | (2006.01) |
| F02D 41/00 | (2006.01) |
| F01N 13/10 | (2010.01) |
| F02M 35/104 | (2006.01) |
| F01N 5/04 | (2006.01) |

(52) U.S. Cl.
CPC ......... *F02D 41/0007* (2013.01); *F01N 13/10* (2013.01); *F02B 29/0406* (2013.01); *F02B 37/04* (2013.01); *F02B 39/10* (2013.01); *F02D 41/0047* (2013.01); *F02D 41/0077* (2013.01); *F02M 26/08* (2016.02); *F02M 26/44* (2016.02); *F02M 35/104* (2013.01); *F02M 35/10157* (2013.01); *F01N 5/04* (2013.01)

(58) Field of Classification Search
CPC .............. F02M 26/08; F02B 37/00–24; F02B 39/00–16; Y02T 10/144
See application file for complete search history.

(56) References Cited

U.S. PATENT DOCUMENTS

| 5,577,385 A * | 11/1996 | Kapich ................. F01D 15/08 123/565 |
| 6,062,026 A * | 5/2000 | Woollenweber ........ F02B 37/04 60/605.2 |

(Continued)

*Primary Examiner* — Laert Dounis
(74) *Attorney, Agent, or Firm* — Knobbe Martens Olson & Bear LLP

(57) ABSTRACT

An electric supercharger system for a hybrid vehicle is disclosed. The electric supercharger system includes a turbocharger for compressing external air using energy of exhaust gas from an exhaust manifold of a combustion engine, an intercooler cooling the compressed air supplied from the turbocharger; and an electric supercharger for further compressing the compressed air from the intercooler. The electric supercharger system is configured to re-circulate at least a part of the exhaust gas the exhaust manifold to the intake manifold and to convert energy of the exhaust gas to generate electricity for charging a battery of the hybrid vehicle.

9 Claims, 4 Drawing Sheets

(56) References Cited

U.S. PATENT DOCUMENTS

| | | | |
|---|---|---|---|
| 2003/0140909 A1* | 7/2003 | Criddle | F01M 13/022 |
| | | | 123/572 |
| 2006/0064981 A1* | 3/2006 | Kojima | F02B 29/0418 |
| | | | 60/612 |
| 2010/0146968 A1* | 6/2010 | Simpson | F02B 37/001 |
| | | | 60/605.2 |
| 2014/0195134 A1* | 7/2014 | Maier | F02B 37/004 |
| | | | 701/101 |
| 2017/0241328 A1* | 8/2017 | Ehrhard | F02M 35/10255 |
| 2017/0260897 A1* | 9/2017 | Ehrhard | F02B 37/04 |
| 2018/0030934 A1* | 2/2018 | Lee | F01N 13/107 |

* cited by examiner

CONTROL SYSTEM OF ELECTRIC SUPERCHARGER AND CONTROL METHOD FOR THE SAME

CROSS-REFERENCE TO RELATED APPLICATION

This application claims priority to and the benefit of Korean Patent Application No. 10-2017-0145539 filed in the Korean Intellectual Property Office on Nov. 2, 2017, the entire contents of which are incorporated herein by reference.

BACKGROUND (a) Field

The present disclosure relates to an electric supercharger system for a hybrid vehicle.

(b) Description of Related Art

Generally, a vehicle mixes air and fuel after sucking external air, and supplies a mixture of the air and the fuel to the engine. The engine combusts the mixture of the fuel and the air to obtain power for driving the vehicle The desired output and combustion efficiency of the engine are obtained only by sufficiently supplying the external air for combustion during the generation of power with the driving of the engine. To increase the combustion efficiency of the engine and improve the output of the engine, a turbocharger for pressurizing and supplying air for combustion has been applied to the vehicle.

The above information disclosed in this Background section is only for enhancement of understanding of the background of the invention. Applicant notes that this section may contain information available before this application. However, by providing this section, Applicant does not admit that any information contained in this section constitutes prior art.

SUMMARY

A turbocharger is configured to compress air supplied to the engine by using a pressure of the exhaust gas exhausted from the engine. There is a limitation in compressing the intake air only by using the pressure of the exhaust gas in response to the driving condition of the vehicle and supplying the compressed air to the engine.

An electric supercharger, which compresses and supplies the intake air by driving a compressor using a separate electric motor can be applied to the vehicle. However, in order to perform supercharge by using the electric supercharger, the power of the battery needs to be used. When a driving torque of the engine is used to charge the power of the battery, fuel efficiency of the vehicle may be lowered.

To reduce a loss of fuel consumption, it may be beneficial to utilize the electric supercharger in a different way if the driving condition of the vehicle is not a supercharge condition.

The present disclosure has been made in an effort to provide a control system of an electric supercharger and a control method for the same having advantages of performing an additional supercharge to an engine, charging a high voltage battery using exhaust energy, or supplying high pressure EGR gas, by a cooperative control of the electric supercharger and a three way valve in response to a driving condition, thereby more improving energy efficiency and more efficiently supplying the EGR gas than the related art.

Embodiments of the present invention provides a control system of an electric supercharger, including: an intake manifold receiving intake air; an exhaust manifold collecting exhaust gas from a combustion chamber and guiding the collected exhaust gas to the outside; a turbocharger compressing external air using energy of the exhaust gas from the exhaust manifold and supplying the compressed external air to the intake manifold; an intercooler cooling the compressed air supplied from the turbocharger to the intake manifold; and an electric supercharger more compressing the compressed air passing through the intercooler, re-circulating a part of the exhaust gas from the exhaust manifold to the intake manifold, or converting the energy of the exhaust gas from the exhaust manifold to generate electricity.

The control system may further include: a first exhaust line connecting the exhaust manifold with the turbocharger; a supercharge line connecting the intercooler with the intake manifold; a first branch line branched from a first point of the first exhaust line to be joined at a first point of the supercharge line; a second branch line branched from a second point of the first exhaust line to be joined at a second point of the supercharge line; and a third branch line connecting the first branch line with the second branch line and provided with the electric supercharger, in which the first point of the first exhaust line may be closer to the exhaust manifold than the second point of the first exhaust line, and the first point of the supercharge line may be closer to the intake manifold than the second point of the supercharge line.

The control system may include a high pressure exhaust gas recirculation (EGR) cooler cooling the re-circulated exhaust gas and supplying the cooled re-circulate exhaust gas to the electric supercharger.

The control system may further include: an on/off valve disposed between the first point of the first exhaust line and the second point of the first exhaust line and opening/closing the first exhaust line; a bypass valve disposed between the first point of the supercharge line and the second point of the first exhaust line to open/close the supercharge line; a first control valve connecting the first branch line with the third branch line, a second control valve connecting the second branch line with the third branch line; and a controller controlling the valves and the electric supercharger.

In the supercharge condition, the on/off valve may be open, the bypass valve may be cut off, the second control valve may be controlled to connect the intercooler with the electric supercharger, and the first control valve may be controlled to connect the electric supercharger with the intake manifold.

In a battery charging condition, the open valve may be cut off, the bypass valve may be open, the first control valve may be controlled to connect the exhaust manifold with the electric supercharger, and the second control valve may be controlled to connect the electric supercharger with the turbocharger.

In the EGR supply condition, the on/off valve may be open, the bypass valve may be open, the second control valve may be controlled to connect the exhaust manifold with the electric supercharger, and the first control valve may be controlled to connect the electric supercharger with the intake manifold.

Another embodiment of the present invention provides a control method for a control system of an electric supercharger including an intake manifold, an exhaust manifold guiding exhaust gas to the outside, a turbocharger compressing external air using energy of the exhaust gas and supplying the compressed external air to the intake manifold, an intercooler cooling the compressed air supplied from the turbocharger to the intake manifold, an electric supercharger more compressing the compressed air passing through the intercooler, re-circulating a part of the exhaust gas from the exhaust manifold to the intake manifold, or converting the energy of the exhaust gas from the exhaust manifold to generate electricity, a high pressure EGR cooler cooling the re-circulated exhaust gas and supplying the cooled re-circulated exhaust gas to the electric supercharger, and a controller controlling a flow of exhaust gas or external air, the control method including: determining a driving condition of a vehicle; and controlling a flow of exhaust gas or external air in response to a driving condition of the vehicle.

If the driving condition of the vehicle is a supercharge condition in the determining of the driving condition of the vehicle, the controlling of the flow of exhaust gas or external air may include: supercharging the external air by delivering the exhaust gas to the turbocharger; cooling the supercharged external air by the intercooler; delivering the cooled external air to the electric supercharger; additionally supercharging the external air from the electric supercharger; and supplying the additionally supercharged external air to the intake manifold.

If the driving condition of the vehicle is a battery charging condition in the determining of the driving condition of the vehicle, the controlling of the flow of exhaust gas or external air may include: generating electricity by converting energy of the exhaust gas by delivering the exhaust gas to the electric supercharger; supercharging the external air by delivering the energy-converted exhaust gas to the turbocharger; cooling the supercharged external air by the intercooler; and supplying the cooled external air to the intake manifold.

If the driving condition of the vehicle is an EGR supply condition in the determining of the driving condition of the vehicle, the controlling of the flow of exhaust gas or external air may include: supercharging the external air by delivering a part of the exhaust gas from the exhaust manifold to the turbocharger; cooling the supercharged external air by the intercooler; and supplying the cooled external air to the intake manifold, and may further include delivering another part of the exhaust gas from the exhaust manifold to the high pressure EGR cooler to be cooled; delivering the cooled exhaust gas to the supercharger; supercharging the exhaust gas through the supercharger; and supplying the supercharged exhaust gas to the intake manifold.

According to an exemplary embodiment of the present invention, the additional supercharge to the engine can be performed, the high voltage battery can be charged using the exhaust energy, or the high pressure EGR gas can be charged, by the cooperative control of the electric supercharger and the three way valve in response to the driving condition, thereby more improving the energy efficiency and more efficiently supplying the EGR gas than the related art.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention.

Figure 1:
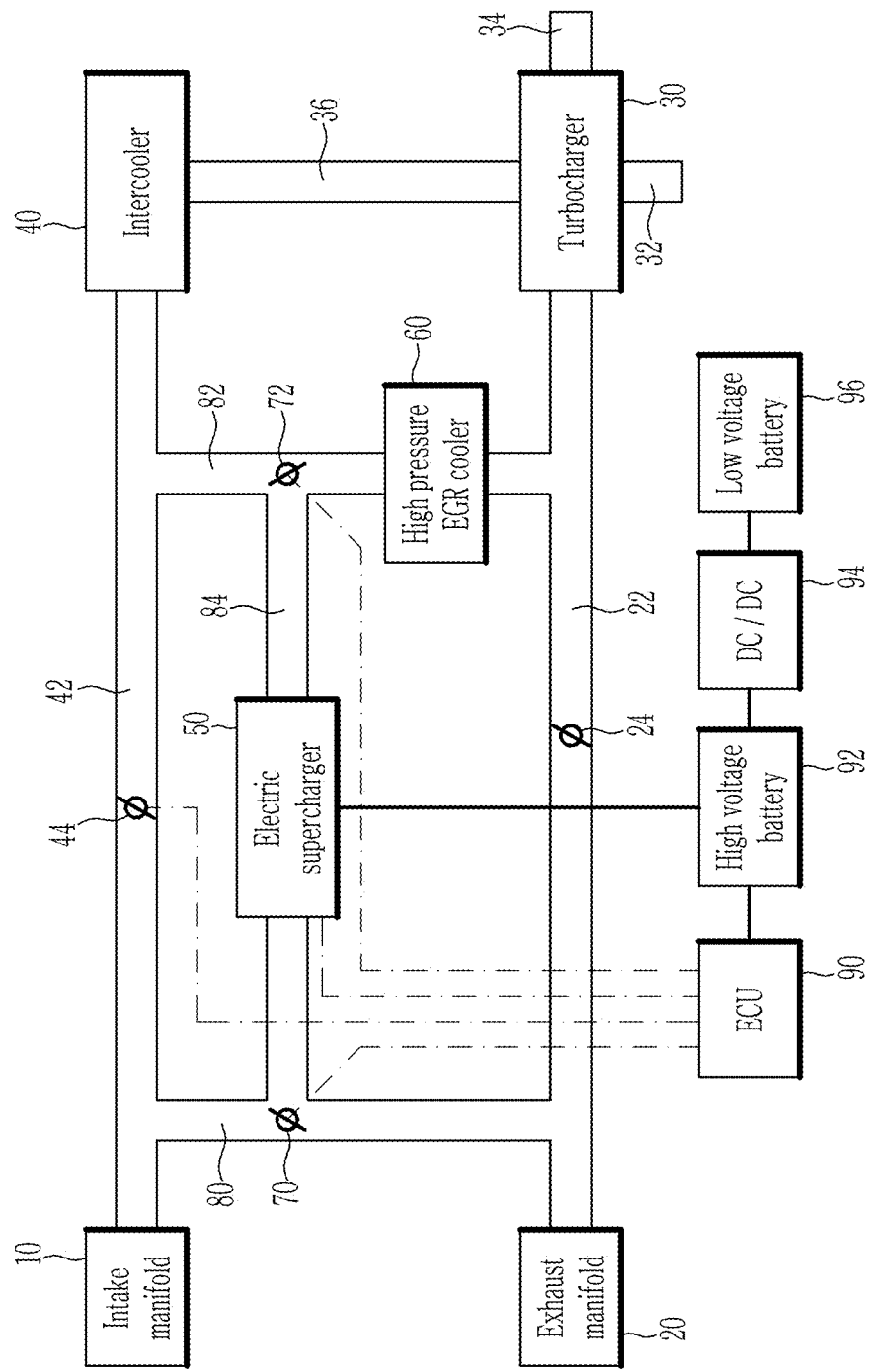
FIG. 1 is a block diagram schematically illustrating a control system of an electric supercharger according to embodiments of the present invention.

An aspect of the invention provides a method for controlling a vehicle having an electric supercharger system. As shown in FIG. 1, a hybrid vehicle has a first three-way valve 70 configured to connect or disconnect fluid communication between two selected from air-intake 10 of an combustion engine, gas-exhaust 20 of the engine and electric supercharger 50. The vehicle includes a second three-way valve 72 configured to connect or disconnect fluid communication between two selected from EGR cooler 60, intercooler 40 and electric supercharger 50.

To operate the electric supercharger system in different operation modes, at least one controller 90 of the vehicle controls the three-way valves 70, 72, valve 24 configured to connect/disconnect fluid communication between exhaust manifold 20 and turbocharger 30, and valve 44 configured to connect/disconnect fluid communication between intake manifold 20 and intercooler 40.

In embodiments, in a first operation mode for supplying supercharge intake to an engine (FIG. 2), the valves 70, 72, 24, 44 operate such that exhaust gas from the engine travels to the exhaust manifold, and then to the turbocharger. The exhaust gas is discharged outside the vehicle via the exhaust line 32. In embodiments, in the first operation mode, exhaust gas is not cooled at the EGR cooler 60 or supplied to the intake manifold. In embodiments, in the first operation mode, air passed through the turbocharger and the intercooler is further compressed at the supercharger using power from battery.

In embodiments, in a second operation mode for charging the battery 92 using the supercharger (FIG. 3), the valves operate such that exhaust gas from the engine travels through the exhaust manifold, the supercharger, the EGR cooler and the turbocharger in sequence. Then, the exhaust gas is discharged via the exhaust line 32. In embodiments, in the second operation mode, exhaust gas passes through the EGR cooler 60 but is not supplied to the intake manifold.

In embodiments, in a third operation mode for charging the battery 92 using the supercharger (FIG. 3), the valves 70, 72, 24, 44 operate (1) such that a first portion of exhaust gas from the engine travels, from the exhaust manifold, directly to the turbocharger, and (2) such that a second portion of the exhaust gas travels through the exhaust manifold, the EGR cooler, the supercharger and the intake manifold in sequence. In embodiments, at least part of the exhaust gas is re-circulated to the engine via the EGR cooler 60 and the supercharger.

In embodiments, the first operation mode is for generating more torque in response to driver's input on an acceleration pedal. The second operation mode is for charging the battery when there is no input on the acceleration pedal and the vehicle is coasting. The third operation mode is for re-circulating exhaust gas from the engine to the intake manifolds.

FIG. 1 is a block diagram schematically illustrating a control system of an electric supercharger according to embodiments of the present invention.

Referring to FIG. 1, a control system of an electric supercharger includes an intake manifold 10 receiving intake air, an exhaust manifold 20 collecting exhaust gas from a combustion chamber and guiding the collected exhaust gas to the outside, a turbocharger 30 compressing external air using energy of the exhaust gas from the exhaust manifold 20 and supplying the compressed external air to the intake manifold 10, an intercooler 40 cooling the compressed air supplied from the turbocharger 30 to the intake manifold 10, and an electric supercharger 50 more compressing the compressed air passing through the intercooler 40, re-circulating a part of the exhaust gas from the exhaust manifold 20 to the intake manifold 10, or converting the energy of the exhaust gas from the exhaust manifold 20 to generate electricity.

The exhaust manifold 20 is connected with the turbocharger 30 through a first exhaust line 22, and the exhaust gas introduced into the turbocharger 30 provides the turbocharger 30 with energy and then is exhausted through a second exhaust line 32 connected with the turbocharger 30.

The turbocharger 30 is connected with a first intake line 34 to receive the external air from the outside, and the introduced external air is introduced into the intercooler 40 through a second intake line 36 connecting between the turbocharger 30 and the intercooler 40.

The intercooler 40 is connected with the intake manifold 10 through a supercharge line 42.

At a first point of the first exhaust line 22, a first branch line 80 is branched to be joined to a first point of the supercharge line 42, at a second point of the first exhaust line 22, the second branch line 82 is branched to be joined to the supercharge line 42, the first branch line 80 and the second branch line 82 are connected to each other through a third branch line 84, and the third branch line 84 is provided with the electric supercharger 50. Here, the first point of the first exhaust line 22 is closer to the exhaust manifold 20 than the second point of the first exhaust line 22, and the first point of the supercharge line 42 is closer to the intake manifold 10 than the second point of the supercharge line 42.

On the second branch line 82, a high pressure exhaust gas recirculation (EGR) cooler that cools re-circulated exhaust gas and supplies the cooled exhaust gas to the electric supercharger 50 is disposed between the first exhaust line 22 and the second valve.

The on/off valve 24 is disposed between the first point of the first exhaust line 22 and the second point of the first exhaust line 22 to open/close the first exhaust line 22.

A bypass valve 44 is disposed between the first point of the supercharge line 42 and the second point of the first exhaust line 22 to open/close the supercharge line 42.

The first branch line 80 and the third branch line 84 are connected with each other through a first control valve 70, and the second branch line 82 and the third branch line 84 are connected with each other through a second control valve 72.

The on/off valve 24, the bypass valve 44, the first control valve 70, the second control valve 72, and the electric supercharger 50 are controlled by a controller 90.

The controller 90 determines a driving condition of a vehicle, and controls the on/off valve 24, the bypass valve 44, the first control valve 70, and the second control valve 72 to control the flow of exhaust gas or the external air in response to the driving condition of the vehicle.

The driving condition of the vehicle includes a supercharge condition, a battery charging condition, an EGR supply condition, or the like.

The driving condition of the vehicle may be determined according to a driving mode (ECO mode, normal mode, sport mode, or the like) of a vehicle, a control mode (DPF play mode, sulfur oxide reduction mode, or the like) of an engine, or other driving conditions (transient period, or the like).

The electric supercharger 50 is connected with a high voltage battery 92 to be driven with power of the high voltage battery 92, and the high voltage battery 92 is connected with a low voltage battery 96 through a converter 94 to be charged with power of the low voltage battery 96. In embodiments, the high voltage battery 92 is a main battery of the hybrid vehicle for supplying power to a wheel-driving motor.

Figure 2:
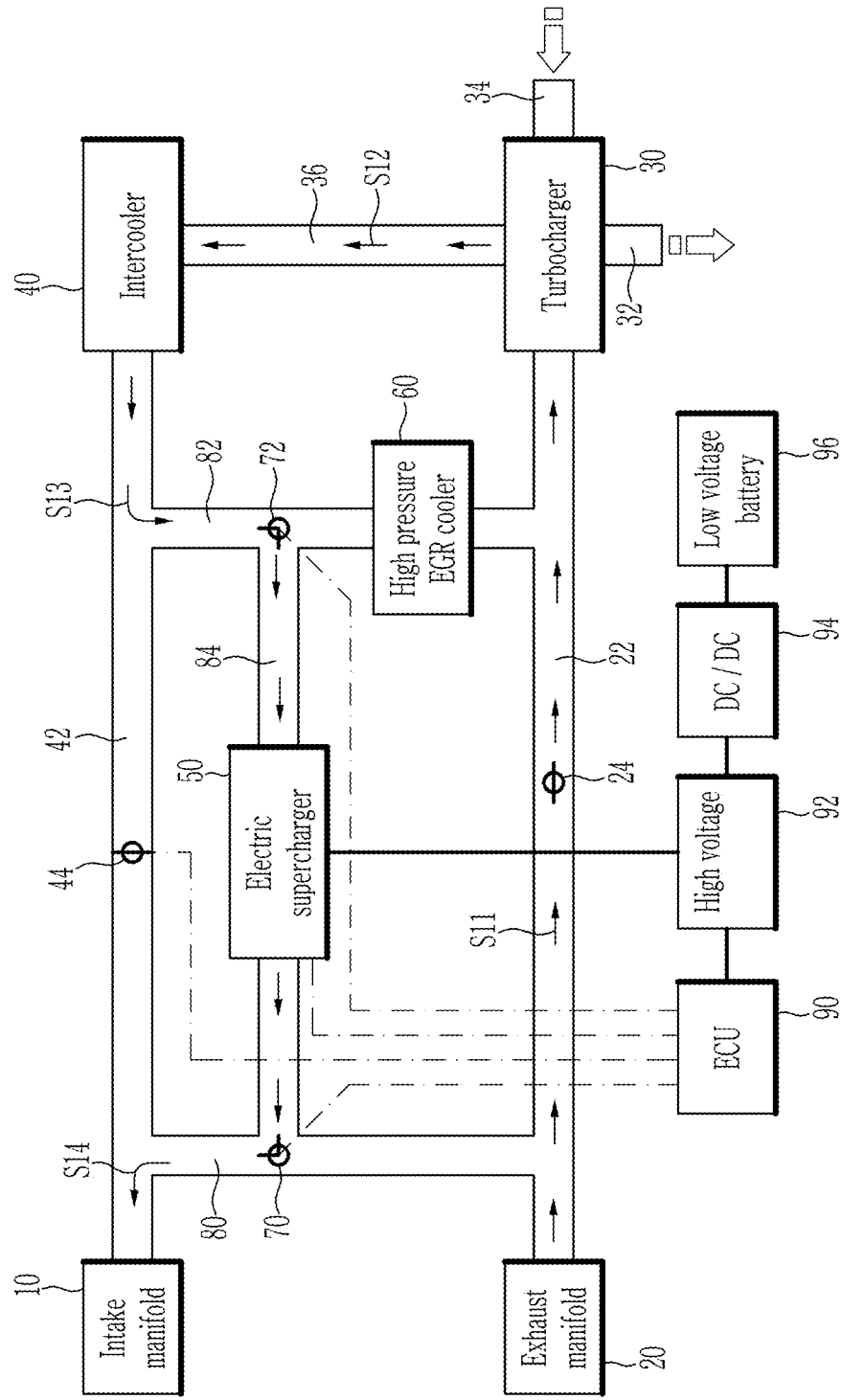
FIGS. 2 to 4 are block diagrams schematically illustrating a control system of an electric supercharger and a control method for the same according to embodiments of the present invention.

FIG. 2 is a block diagram schematically illustrating a control system of an electric supercharger and a control method for the same according to embodiments of the present invention.

When the driving condition of the vehicle is a supercharge condition, the on/off valve 24 is open, the bypass valve 44 is cut off, the second control valve 72 is controlled so that the intercooler 40 is connected with the electric supercharger 50, and the first control valve 70 is controlled so that the electric supercharger 50 is connected with the intake manifold 10.

In this case, the exhaust gas from the exhaust manifold 20 is delivered to the turbocharger 30 to supply energy to supercharge the external air (S11), the supercharged external air is cooled by the intercooler 40 (S12), the cooled external air is additionally supercharged through the electric supercharger 50 (S13), and the additionally supercharged air is supplied to the intake manifold 10 (S14).

In this way, it can be expected to obtain more and more powerful engine output by performing the additional supercharging using the electric supercharger 50.

Figure 3:
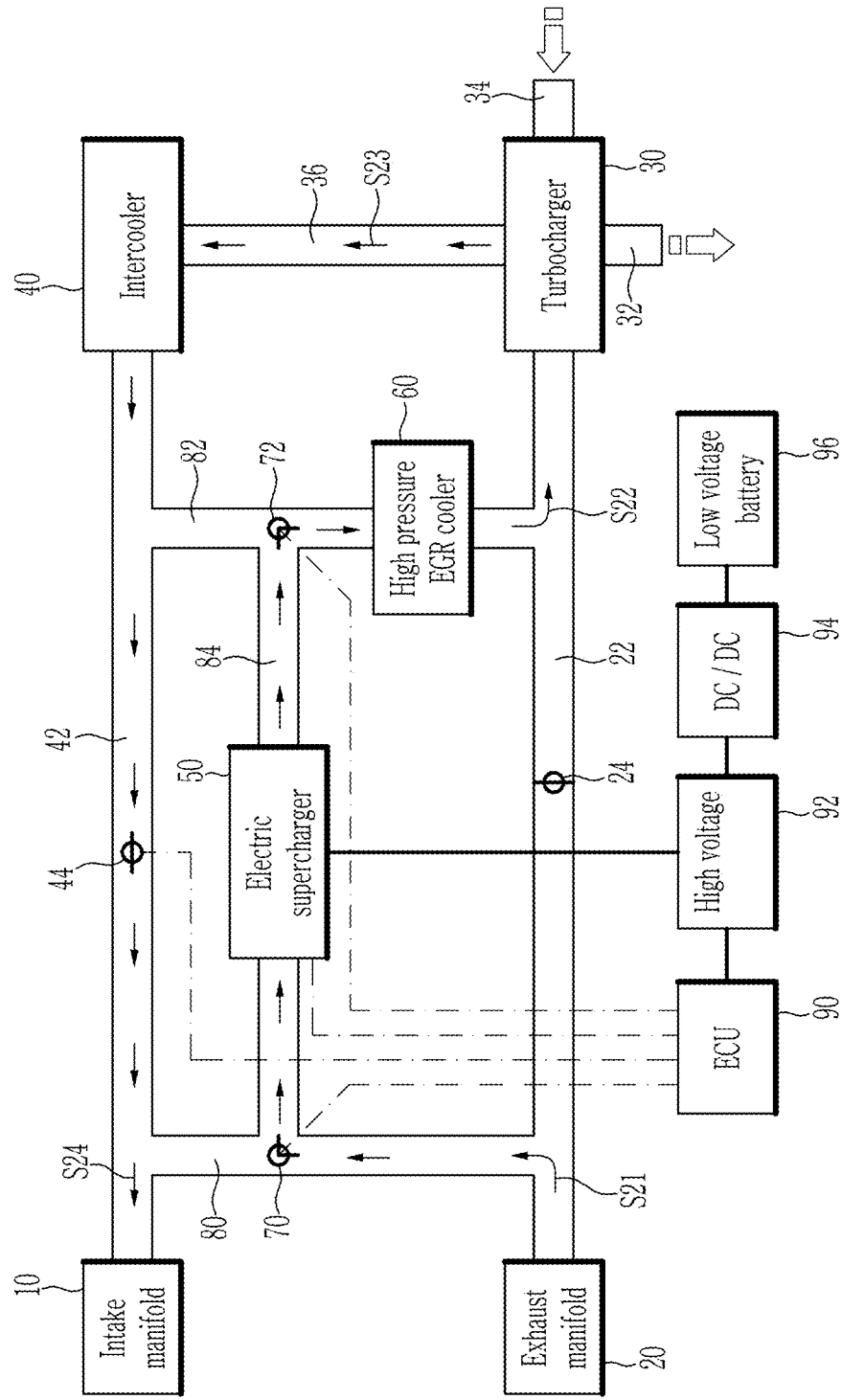

FIG. 3 is a block diagram schematically illustrating a control system of an electric supercharger 50 and a control method for the same according to embodiments of the present invention.

When the driving condition of the vehicle is the battery charging condition, the on/off valve 24 is cut off, the bypass valve 44 is open, the first control valve 70 is controlled so that the exhaust manifold 20 is connected with the electric supercharger 50, and the second control valve 72 is controlled so that the electric supercharger 50 is connected with the turbocharger 30.

In this case, the exhaust gas from the exhaust manifold 20 is delivered to the electric supercharger 50, the electric supercharger 50 converts the energy of the exhaust gas to generate electricity, thereby charging the high voltage battery 92 (S21), the exhaust gas passing through the electric supercharger 50 is delivered to the turbocharger 30 to supply the energy for supercharging the external air (S22), the supercharged external air is cooled by the intercooler 40 (S23), and the cooled external air is supplied to the intake manifold (S24).

Generally, to perform the supercharging using the electric supercharger 50, the power of the high voltage battery 92 needs to be used, the high voltage battery 92 is charged with the power of the low voltage battery 96, and the low voltage battery 96 is charged with a driving torque of the engine, such that if the supercharging is performed by the electric supercharger 50, fuel efficiency may be reduced.

According to the exemplary embodiment of the present invention, a counter electromotive force is generated when the electric supercharger 50 is rotated reversely by the energy of the exhaust gas from the exhaust manifold 20. The high voltage battery 92 can be charged with the counter electromotive force. When the driving condition of the vehicle is not a supercharge condition, the high voltage battery 92 is charged by the electric supercharger 50, such that the loss of the fuel consumption can be reduced.

Figure 4:
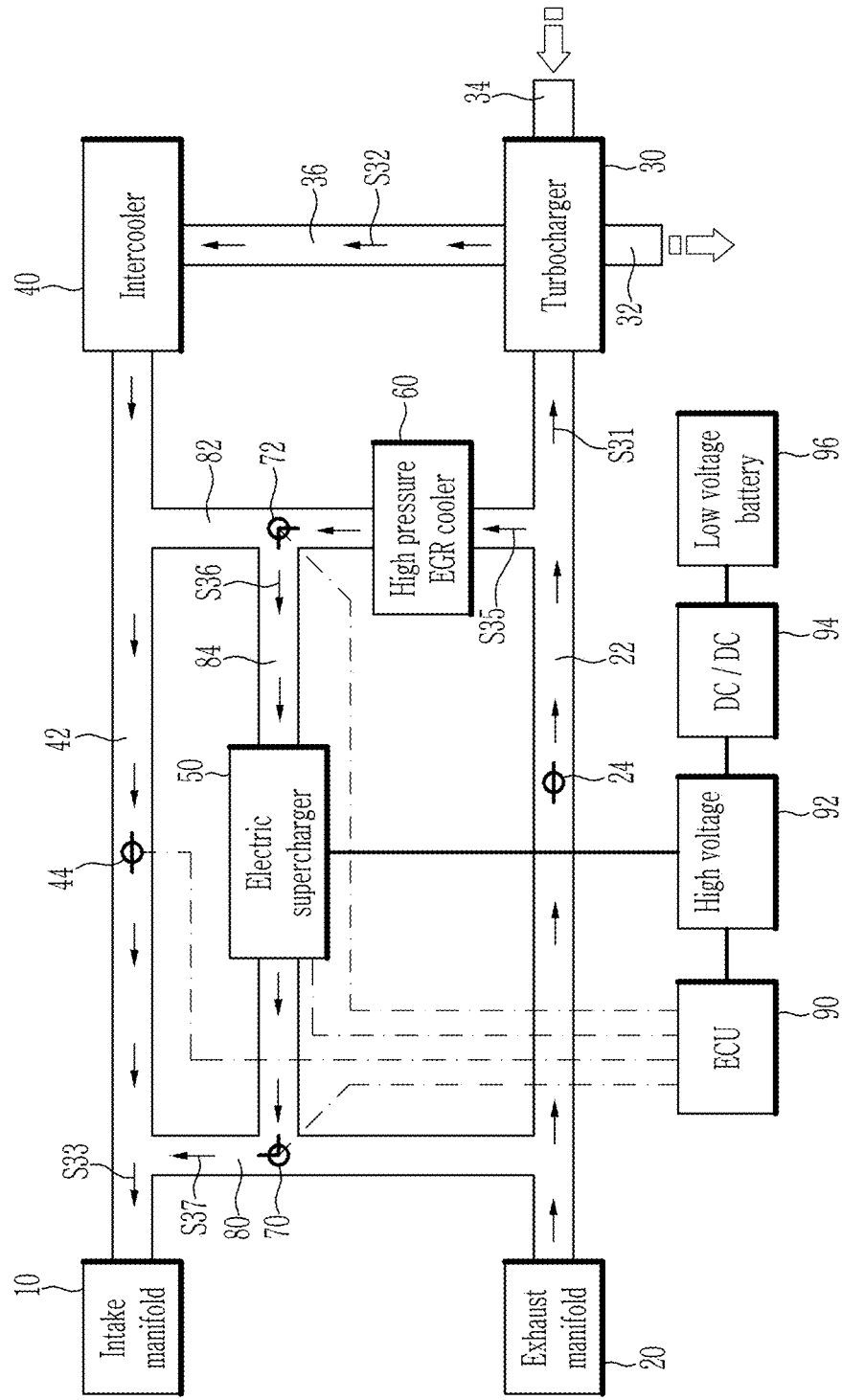

FIG. 4 is a block diagram schematically illustrating a control system of an electric supercharger and a control method for the same according to embodiments of the present invention.

When the driving condition of the vehicle is an EGR supply condition, the on/off valve 24 is open, the bypass valve 44 is open, the second control valve 72 is controlled so that the exhaust manifold 20 is connected with the electric supercharger 50, and the first control valve 70 is controlled so that the electric supercharger 50 is connected with the intake manifold 10.

In this case, the exhaust gas from the exhaust manifold 20 flows along two paths.

Some of the exhaust gas is delivered to the turbocharger 30 to supply energy for supercharging external air (S31), the supercharged external air is cooled by the intercooler 40 (S32), and the cooled external air is supplied to the intake manifold 10 (S33).

Some of the exhaust gas is cooled by the high pressure EGR cooler 60 (S35), the cooled exhaust gas is supercharged by the electric supercharger 50 (S36), and the supercharged exhaust gas is supplied to the intake manifold 10 (S37).

In this way, as a method for controlling a supply of high pressure EGR gas through the electric supercharger 50 is used along with the typical method for supplying low pressure EGR gas, the EGR responsiveness can be improved and the supply of EGR gas can be controlled more easily, in particular, a large amount of EGR gas can be efficiently supplied if necessary.

While this invention has been described in connection with certain embodiments, it is to be understood that the invention is not limited to the disclosed embodiments. On the contrary, it is intended to cover various modifications and equivalent arrangements included within the spirit and scope of the appended claims.

| <Description of symbols> | |
| --- | --- |
| 10: Intake manifold | 20: Exhaust manifold |
| 22: First exhaust line | 24: On/off valve |
| 30: Turbocharger | 32: Second exhaust line |
| 34: First intake line | 36: Second intake line |
| 40: Intercooler | 42: Supercharge line |
| 44: Bypass valve | 50: Electric supercharger |
| 60: High pressure EGR cooler | 70: First control valve |
| 72: Second control valve | 80: First branch line |
| 82: Second branch line | 84: Third branch line |
| 90: Controller | 92: High voltage battery |
| 94: Converter | 96: Low voltage battery |

What is claimed is:

1. A control system of an electric supercharger, comprising:
   an intake manifold receiving intake air;
   an exhaust manifold collecting exhaust gas from a combustion chamber and guiding the collected exhaust gas to the outside;
   a turbocharger compressing external air using energy of the exhaust gas from the exhaust manifold and supplying the compressed external air to the intake manifold;
   an intercooler cooling the compressed air supplied from the turbocharger to the intake manifold;
   an electric supercharger further compressing the compressed air passing through the intercooler, re-circulating a part of the exhaust gas from the exhaust manifold to the intake manifold, or converting the energy of the exhaust gas from the exhaust manifold to generate electricity;
   a first exhaust line connecting the exhaust manifold with the turbocharger;
   a supercharge line connecting the intercooler with the intake manifold;
   a first branch line branched from a first point of the first exhaust line to be joined at a first point of the supercharge line;
   a second branch line branched from a second point of the first exhaust line to be joined at a second point of the supercharge line; and
   a third branch line connecting the first branch line with the second branch line and provided with the electric supercharger,
   wherein the first point of the first exhaust line is closer to the exhaust manifold than the second point of the first exhaust line, and
   wherein the first point of the supercharge line is closer to the intake manifold than the second point of the supercharge line.

2. The control system of claim 1, wherein:
   on the second branch line,
   a high pressure exhaust gas recirculation (EGR) cooler cooling re-circulated exhaust gas and supplying the cooled re-circulated exhaust gas to the electric supercharger is disposed between the first exhaust line and a second control valve.

3. The control system of claim 2, further comprising:
   an on/off valve disposed between the first point of the first exhaust line and the second point of the first exhaust line and opening/closing the first exhaust line;
   a bypass valve disposed between the first point of the supercharge line and the second point of the first exhaust line to open/close the supercharge line;
   a first control valve connecting the first branch line with the third branch line;
   the second control valve connecting the second branch line with the third branch line; and
   a controller controlling the on/off valve, the bypass valve, the first control valve, the second control valve, and the electric supercharger.

4. The control system of claim 3, wherein:
   in a supercharge condition,
   the on/off valve is open,
   the bypass valve is cut off,
   the second control valve is controlled to connect the intercooler with the electric supercharger, and
   the first control valve is controlled to connect the electric supercharger with the intake manifold.

5. The control system of claim 3, wherein:
   in a battery charging condition,
   the on/off valve is cut off,
   the bypass valve is open,
   the first control valve is controlled to connect the exhaust manifold with the electric supercharger, and
   the second control valve is controlled to connect the electric supercharger with the turbocharger.

6. The control system of claim 3, wherein:
   in an EGR supply condition,
   the on/off valve is open,
   the bypass valve is open,
   the second control valve is controlled to connect the exhaust manifold with the electric supercharger, and
   the first control valve is controlled to connect the electric supercharger with the intake manifold.

7. A control method for a control system of an electric supercharger including an intake manifold, an exhaust manifold guiding exhaust gas to the outside, a turbocharger compressing external air using energy of the exhaust gas and supplying the compressed external air to the intake manifold, an intercooler cooling the compressed air supplied from the turbocharger to the intake manifold, an electric supercharger further compressing the compressed air passing through the intercooler, re-circulating a part of the exhaust gas from the exhaust manifold to the intake manifold, or converting the energy of the exhaust gas from the exhaust manifold to generate electricity, a high pressure EGR cooler cooling the re-circulated exhaust gas and supplying the cooled re-circulated exhaust gas to the electric supercharger, and a controller controlling a flow of exhaust gas or external air, the control method comprising:

determining a driving condition of a vehicle; and controlling a flow of exhaust gas or external air in response to the driving condition of the vehicle, wherein, if the driving condition of the vehicle is a battery charging condition in the determining of the driving condition of the vehicle, the controlling of the flow of exhaust gas or external air includes:

generating electricity by converting energy of the exhaust gas by delivering the exhaust gas to the electric supercharger;

supercharging the external air by delivering the exhaust gas passing through the electric supercharger to the turbocharger;

cooling the supercharged external air by the intercooler; and supplying the cooled external air to the intake manifold.

8. The control method of claim 7, wherein:

if the driving condition of the vehicle is a supercharge condition in the determining of the driving condition of the vehicle, the controlling of the flow of exhaust gas or external air includes:

supercharging the external air by delivering the exhaust gas to the turbocharger;

cooling the supercharged external air by the intercooler;

delivering the cooled external air to the electric supercharger;

additionally supercharging the external air from the electric supercharger; and supplying the additionally supercharged external air to the intake manifold.

9. The control method of claim 7, wherein:

if the driving condition of the vehicle is an EGR supply condition in the determining of the driving condition of the vehicle, the controlling of the flow of exhaust gas or external air includes:

supercharging the external air by delivering a part of the exhaust gas from the exhaust manifold to the turbocharger;

cooling the supercharged external air by the intercooler; and supplying the cooled external air to the intake manifold, and the controlling of the flow of exhaust gas or external air further includes:

delivering another part of the exhaust gas from the exhaust manifold to the high pressure EGR cooler to be cooled;

delivering the cooled exhaust gas to the electric supercharger to be supercharged; and supplying the supercharged exhaust gas to the intake manifold.

\* \* \* \* \*